(12) United States Patent
Nosley

(10) Patent No.: US 9,774,423 B2
(45) Date of Patent: Sep. 26, 2017

(54) BROADCAST CHANNEL TRANSMISSION METHOD AND APPARATUS

(75) Inventor: Michael Nosley, Berkshire (GB)

(73) Assignee: Lenovo Innovations Limited (Hong Kong), Quarry Bay, Hong Kong (CN)

( * ) Notice: Subject to any disclaimer, the term of this patent is extended or adjusted under 35 U.S.C. 154(b) by 713 days.

(21) Appl. No.: 12/308,719

(22) PCT Filed: Jul. 2, 2007

(86) PCT No.: PCT/JP2007/063616
§ 371 (c)(1),
(2), (4) Date: Dec. 22, 2008

(87) PCT Pub. No.: WO2008/004681
PCT Pub. Date: Jan. 10, 2008

(65) Prior Publication Data
US 2009/0191885 A1    Jul. 30, 2009

(30) Foreign Application Priority Data

Jul. 3, 2006 (GB) .................................. 0613065.2

(51) Int. Cl.
H04L 5/00 (2006.01)
H04W 48/12 (2009.01)
H04W 72/02 (2009.01)

(52) U.S. Cl.
CPC ............ H04L 5/0007 (2013.01); H04L 5/001 (2013.01); H04L 5/0053 (2013.01); H04W 48/12 (2013.01); H04W 72/02 (2013.01)

(58) Field of Classification Search
CPC ..... H04L 5/0007; H04L 5/001; H04L 5/0053; H04W 48/08; H04W 48/10; H04W 48/12; H04W 72/02
See application file for complete search history.

(56) References Cited

U.S. PATENT DOCUMENTS

| 2004/0013111 A1 * | 1/2004 | Faccin ......................... 370/378 |
| 2004/0092274 A1 | 5/2004 | Moon et al. |
| 2007/0173269 A1 | 7/2007 | Laroia et al. |

(Continued)

FOREIGN PATENT DOCUMENTS

| EP | 1892864 A1 | 6/2006 | |
| JP | 11-215075 | * 8/1999 | ............... H04H 1/00 |

(Continued)

OTHER PUBLICATIONS

NTT DoCoMo et al., "Broadcast Channel Structure foe E-UTRA Downlink" May 8-12, 2006, 3GPP TSGRAN WG1, pp. 1-8.*

(Continued)

*Primary Examiner* — Joseph Bednash
(74) *Attorney, Agent, or Firm* — Kunzler Law Group

(57) ABSTRACT

The invention provides for a broadcast channel transmission method comprising delivering broadcast channel data as a series of blocks (1-16), each series being provided in a segment (1-16) of the system bandwidth (20), and distributing the broadcast channel data within each series of blocks (1-16) such that user equipment capable of receiving more than one segment (1-16) receives different blocks from different segments within a time period which is a multiple of the time period (T) for receipt of all blocks within one segment.

9 Claims, 3 Drawing Sheets

(56) References Cited

U.S. PATENT DOCUMENTS

2009/0088212 A1* 4/2009 Haga et al. ............... 455/561
2009/0220014 A1 9/2009 Higuchi et al.
2011/0216844 A1 9/2011 Higuchi et al.

FOREIGN PATENT DOCUMENTS

| JP | 2002-204204 | | 7/2002 | |
|----|----|----|----|----|
| JP | 2004-159017 | | 6/2004 | |
| WO | WO 2007/080892 | | 7/2007 | |
| WO | WO 2007/122733 | * | 11/2007 | ............... H04Q 7/38 |

OTHER PUBLICATIONS

Nortel, "Broadcast Channel Design for E-UTRA" Mar. 27-31, 2006, 3GPP TSGRAN WG1, pp. 1-5.*
LG Electronics Inc. "Cell/UE Bandwidth Scenarios for LTE", 3GPP TSG-RAN WG2 #51, R2-060578, Feb. 13-17, 2006, Denver, USA, entire document.*
LG Electronics, "Considerations on BCH", 3GPP TSG RAN WG2 Meeting #51, R2-060584, Denver, USA, Feb. 13-17, 2006, entire document.*
Panasonic, "Flexible rate transmission of BCCH", 3GPP TSG RAN WG2 #52, R2-060887, Mar. 27-31, 2006, Athens, Greece, entire document.*
NEC, "BCH design for LTE", TSG-RAN Working Group 2 #53, R2-061543, May 8-12, 2006, Shanghai China, entire document.*
Siemens, "Considerations on E-UTRA Cell Search and Initial Access", 3GPP TSG-RAN WG1 #44, Tdoc R1-060358, Denver, USA, Feb. 13-17, 2006.*
Ericsson et al. "Text Proposal on Cell Search in Evolved UTRA", TSG-RAN WG1 #43, R1-051308, Seoul, Korea, Nov. 7-11, 2005.*
3GPP TR 25.913 V7.3.0 (Mar. 2006), "3rd Generation Partnership Project; Technical Specification Group Radio Access Network; Requirements for Evolved UTRA (E-UTRA) and Evolved UTRAN (E-UTRAN) (Release 7)", Mar. 31, 2006.*
European Search Report dated Jan. 14, 2014.
3GPP TSG RAN WG1 #42BIS: "Basic Structure of Control Channel and Synchronization Channel for Scalable Bandwidth in Evolved UTRA Downlink", $3^{rd}$ Generation Partnership Project (3GPP); Technicalspecification Group (TSG) Radio Access Network (RAN); Workinggroup 1 (WG1), XX, XX, No. R1-051147, Oct. 14, 2005 (Oct. 14, 2005), pp. 1-13, XP003015540 dated Oct. 14, 2005.

* cited by examiner

| 1 | 2 | 3 | 4 | 5 | 6 | 7 | 8 |
|---|---|---|---|---|---|---|---|
| 5 | 6 | 7 | 8 | 1 | 2 | 3 | 4 |
| 3 | 4 | 1 | 2 | 7 | 8 | 5 | 6 |
| 7 | 8 | 5 | 6 | 3 | 4 | 1 | 2 |
| 2 | 1 | 4 | 3 | 6 | 5 | 8 | 7 |
| 6 | 5 | 8 | 7 | 2 | 1 | 4 | 3 |
| 4 | 3 | 2 | 1 | 8 | 7 | 6 | 5 |
| 8 | 7 | 6 | 5 | 4 | 3 | 2 | 1 |

Fig. 6

| 1 | 2 | 3 | 4 |
|---|---|---|---|
| 3 | 4 | 1 | 2 |
| 2 | 1 | 4 | 3 |
| 4 | 3 | 2 | 1 |

Fig. 8

| 1 | 2 |
|---|---|
| 2 | 1 |

Fig. 9

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| 9 | 10 | 11 | 12 | 13 | 14 | 15 | 16 | 1 | 2 | 3 | 4 | 5 | 6 | 7 | 8 |
| 5 | 6 | 7 | 8 | 1 | 2 | 3 | 4 | 13 | 14 | 15 | 16 | 9 | 10 | 11 | 12 |
| 13 | 14 | 15 | 16 | 9 | 10 | 11 | 12 | 5 | 6 | 7 | 8 | 1 | 2 | 3 | 4 |
| 3 | 4 | 1 | 2 | 7 | 8 | 5 | 6 | 11 | 12 | 9 | 10 | 15 | 16 | 13 | 14 |
| 11 | 12 | 9 | 10 | 15 | 16 | 13 | 14 | 3 | 4 | 1 | 2 | 7 | 8 | 5 | 6 |
| 7 | 8 | 5 | 6 | 3 | 4 | 1 | 2 | 15 | 16 | 13 | 14 | 11 | 12 | 9 | 10 |
| 15 | 16 | 13 | 14 | 11 | 12 | 9 | 10 | 7 | 8 | 5 | 6 | 3 | 4 | 1 | 2 |
| 2 | 1 | 4 | 3 | 6 | 5 | 8 | 7 | 10 | 9 | 12 | 11 | 14 | 13 | 16 | 15 |
| 10 | 9 | 12 | 11 | 14 | 13 | 16 | 15 | 2 | 1 | 4 | 3 | 6 | 5 | 8 | 7 |
| 6 | 5 | 8 | 7 | 2 | 1 | 4 | 3 | 14 | 13 | 16 | 15 | 10 | 9 | 12 | 11 |
| 14 | 13 | 16 | 15 | 10 | 9 | 12 | 11 | 6 | 5 | 8 | 7 | 2 | 1 | 4 | 3 |
| 4 | 3 | 2 | 1 | 8 | 7 | 6 | 5 | 12 | 11 | 10 | 9 | 16 | 15 | 14 | 13 |
| 12 | 11 | 10 | 9 | 16 | 15 | 14 | 13 | 4 | 3 | 2 | 1 | 8 | 7 | 6 | 5 |
| 8 | 7 | 6 | 5 | 4 | 3 | 2 | 1 | 16 | 15 | 14 | 13 | 12 | 11 | 10 | 9 |
| 16 | 15 | 14 | 13 | 12 | 11 | 10 | 9 | 8 | 7 | 6 | 5 | 4 | 3 | 2 | 1 |

Fig. 7

BROADCAST CHANNEL TRANSMISSION METHOD AND APPARATUS

This application is based upon and claims the benefit of priority from United Kingdom patent application No. 0613065.2, filed on Jul. 3, 2006, the disclosure of which is incorporated herein in its entirety by reference.

TECHNICAL FIELD

The present invention relates to a method and arrangement for transmitting a broadcast channel and in particular a broadcast channel for a Long Term Evolution (LTE) cell in order to accommodate User Equipment (UE) handsets offering different capability levels.

BACKGROUND ART

It is of course important for the Broadcast Channel (BCH) of an LTE cell to accommodate UE handsets which only exhibit a minimum handset capability and in addition to handsets exhibiting a current maximum capability. Such lower capability handsets will of course offer an overall performance which is lower than that of the comparatively higher capability handsets.

Insofar as it maybe deemed unacceptable for UE of low capability to keep shifting their reception band between the sub-carriers transporting dedicated channels and those transporting the broadcast channel, it will be necessary to deliver the broadcast data through a relatively narrow band, i.e. that of the least-capable UE handset, and thereby allowing some space for the dedicated channels. This of course sets a limitation on the time required to acquire all of the broadcast information. While it is of course possible to dedicate portions of the system bandwidth to the low capability UE handsets, and other portions to the higher-capability UE handsets, limitations nevertheless remain. While attempts have been made at providing for UE handsets exhibiting differing capabilities, these generally involve the narrowing of the broadcast channel, the repeating of the broadcast channel and also a combination of the aforementioned involving narrow-band broadcast channel repeats, limitations and disadvantages nevertheless remain particularly with regard to the perceived wasted communication system capacity.

DISCLOSURE OF INVENTION

The present invention seeks to provide for a method of broadcast channel transmission, and a broadcast channel transmission means, employing a broadcast channel structure which offers advantages over known methods and arrangements for broadcast channel transmission.

According to a first exemplary aspect of the present invention there is provided a broadcast channel transmission method comprising delivering broadcast channel data as a series of blocks, each series being provided in a segment of the system bandwidth, and distributing the broadcast channel data within each series of blocks such that user equipment capable of receiving more than one segment receives different blocks from different segments within a time period wherein the total time period for receipt of all blocks within one segment is a multiple of the said time period.

According to another exemplary aspect of the present invention there is provided a broadcast channel transmission means comprising means for delivering broadcast channel data as a series of blocks, each series being provided in a segment of the system bandwidth, and arranged such that the broadcast channel is distributed within each series of blocks such that user equipment capable of receiving more than one segment is arranged to receive different blocks from different segments within a time period wherein the total time period for receipt of all the blocks within one segment is a multiple of the said time period.

BRIEF DESCRIPTION OF DRAWINGS

FIGS. 6-9 comprise block-distribution grids in accordance with four different exemplary embodiments of the present invention.

BEST MODE FOR CARRYING OUT THE INVENTION

The invention is described further hereinafter, by way of example only, with reference to the accompanying drawings.

Figure 1:
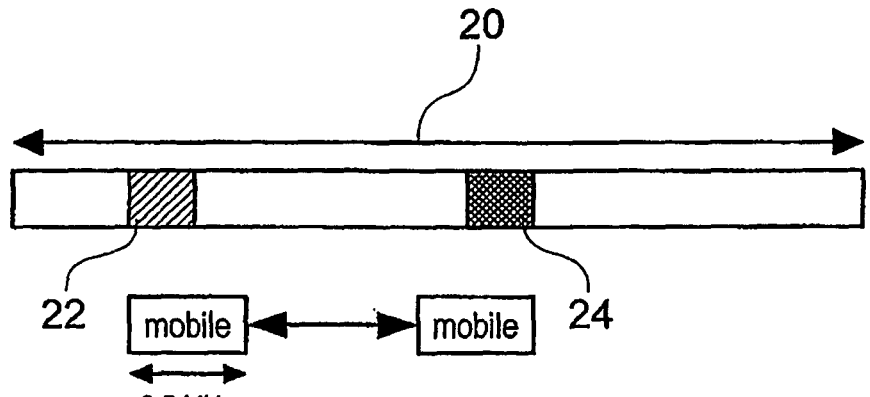
FIGS. 1-4 comprise schematic system bandwidth representations illustrating broadcast channel arrangements that exhibit limitations as compared with the present invention.

Turning first to FIG. 1, there is provided an illustration of a 20 MHz system bandwidth 20 in which there is illustrated a user equipment handset allocation 22 and broadcast channel 24.

In this illustrated example, the user equipment allocation 22 comprises a 2.5 MHz band and, generally, in order to obtain the broadcast channel data, the user equipment would be required to shift its RF band to that of the broadcast channel 24. FIG. 1 also illustrates the positioning of a 2.5 MHz capable UE handset including the possible shift in its RF band.

Figure 2:
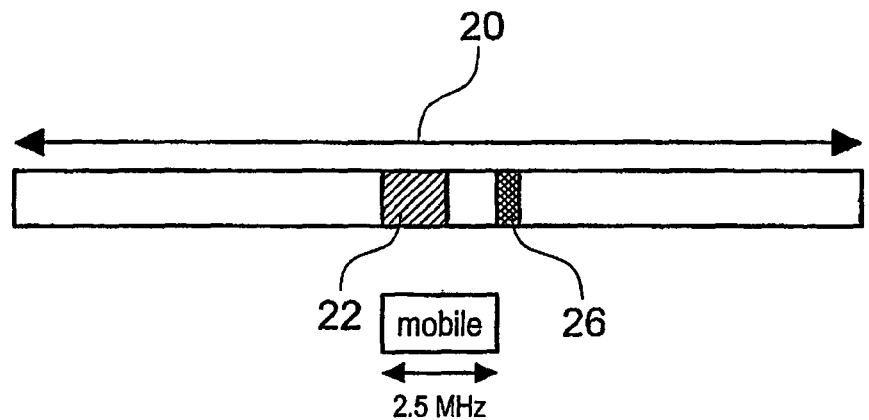
Figure 3:
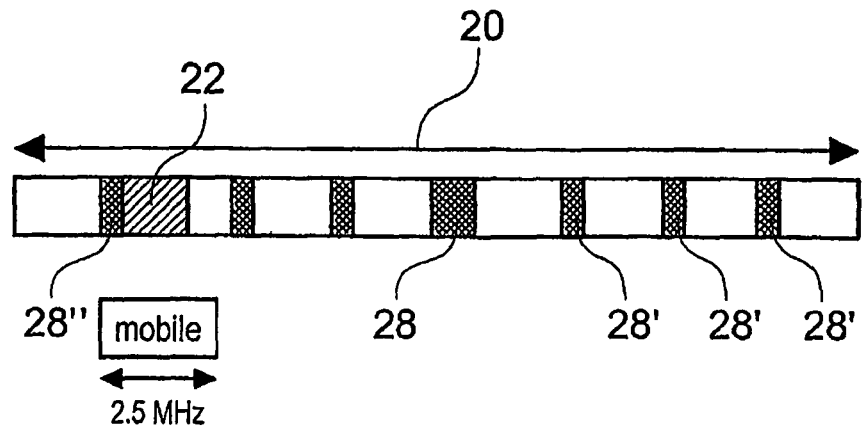

Turning now to FIG. 2, there is illustrated one possible attempt to allow for the support of a lesser-capability UE handset and which again is illustrated in relation to a 20 MHz system band 20. Here the broadcast channel 26 is narrowed such that the UE handset allocation 22 which again comprises a 2.5 MHz band can approach the broadcast channel 26. This arrangement does not assign resources which are too far away from the broadcast channel 26 and also requires that the allocation for the broadcast channel be reduced, and therefore spread longer in time, in order to leave enough resources available for dedicated allocations. Again, FIG. 2 also illustrates the possible positioning of a 2.5 MHz capable UE handset.

It should of course be appreciated when considering FIGS. 1-4, that the particular depiction of the broadcast channel does not imply a continuous resource allocation, but rather indicates varying widths of the broadcast channel so as to indicate different relative resource occupations.

Turning now to FIG. 3, there is again illustrated a 20 MHz bandwidth 20 which in this illustration includes a relatively fast central broadcast channel 28, and repeated, lower rate, broadcast channel elements 28'. The UE handset again has a 2.5 MHz band allocation 22 which is located close to one of the slow repeated broadcast channel band 28".

As will be appreciated, the broadcast channel is then transmitted at a higher rate at the centre of the system bandwidth whilst also being transmitted at a lower rate near the source allocated to the lower-capability UE handset.

With the broadcast channel being transmitted in several fixed places 28' and 28" within the system bandwidth 20, the lower-capability UE will be allocated resources 22 such that an instance of the 28" of the broadcast channel remains within its reach. The possible positioning of a 2.5 MHz capable UE handset is again illustrated.

Figure 4:
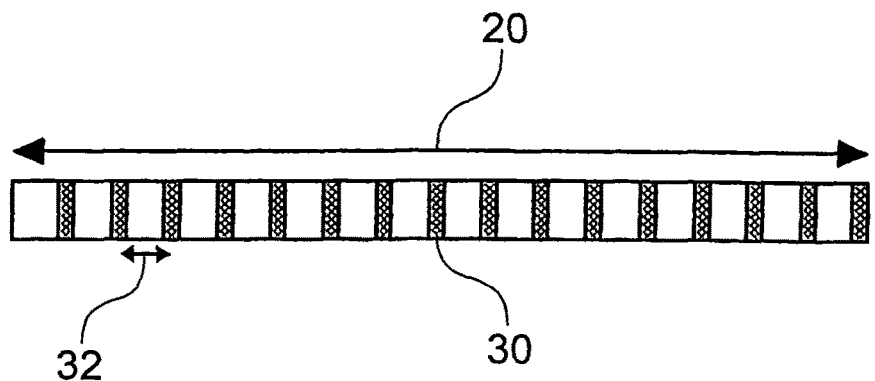

Turning now to FIG. 4, there is illustrated a more recent proposal found in 3GPP Tdoc R2-060584, and which consists of the distribution of a single type of broadcast channel across the whole system bandwidth and dimensioned so as to support a minimal source rate for 1.25 MHz capable user equipment handsets.

As illustrated in FIG. 4, within the same 20 MHz system bandwidth 20 as illustrated in the previous drawings, there are illustrated distributed broadcast channels 30 each separated by a 1.25 MHz band 32.

However, with regard to FIG. 4, it will be appreciated that all of the UE handsets, with the exception of the least-capable handset, will always receive multiple copies of the broadcast information and this is of course seen as a waste of system capacity.

The present invention is advantageous and serves to alleviate any such wasted capacity in so far as the otherwise redundant instances of the broadcast channel are employed so as to increase the rate of system information acquisition for higher capability UE devices.

Ideally a mobile with N×1.25 MHz bandwidth capability would acquire all of the system information within 1/N the time necessary for the 1.25 MHz capable UE handset.

When the highest capability is $N=2^P$ that of the least capable UE handsets, and with p being an integer greater than 1, it becomes possible to distribute broadcast system information over time and frequency in such a way so as to reduce access time for the vast majority of UE handset devices having a capability greater than the least-capable device.

Also, system operators commonly wish to exhibit some flexibility in the way they allocate spectrum to any particular cells and the present invention can accommodate this. It is noted that a wideband such as a 20 MHz system bandwidth may not be fully available, at least to begin with. The spectrum allocation may therefore need to change over time and so any proposed solutions dealing with the problem faced by the present invention and which assume a fixed wideband will not be practically available or will require extensions making the system disadvantageously more complex.

In any case, it is appreciated that operators are likely to prefer flexible solutions which can be adjusted dynamically.

A particular advantage of the present invention, as clarified further below, is that the proposed distributed broadcast channel could be deployed in cells with a narrow band but with a view to evolving towards a 20 MHz system bandwidth in future. The structure of the broadcast channel then remains the same as bands are coalesced. As the system band widens, the time to require system information would diminish for those UE handsets with sufficient capability, and without reconfiguring the broadcast channel nor dropping support for UE handset devices tailored to the original narrow-band system.

The broadcast channel can advantageously be generated at the access gateway and the mapping can be achieved at the eNodeBs. Of course, if the spectrum allocation is different across eNodeBs, then the present invention advantageously allows for independent mapping without requiring the access gateway to send different broadcast channels per eNodeB.

By way of further illustration of the concept of the present invention, and considering a capability factor of $N=2^P$, the following table illustrates the situation where p=4. As will be appreciated, this represents an arrangement in which, with the system bandwidth of 20 MHz, and a minimum capability bandwidth of 1.2 MHz, it will be seen that the time to acquire the whole broadcast channel cycle as illustrated depends upon the UE handset capability.

| Mobile bandwidth capability | Time to acquire the whole BCH cycle |
| --- | --- |
| 1.25 MHz | T |
| 2.5 MHz | T/2 |
| 5 MHz | T/4 |
| 10 MHz | T/8 |
| 20 MHz | T/16 |

That is, for the least capable UE handset devices, i.e. those offering 1.25 MHz capability, the time to acquire the whole broadcast channel cycle will be period T, whereas the UE device handsets offering the highest bandwidth capability of 20 MHz, i.e. 16 times that of the lowest capability, the time to acquire the whole broadcast channel cycle will of course be T/16.

Thus, as illustrated in the above table, the complete system bandwidth divides into sixteen 1.25 MHz segments such that the broadcast channel cycle then be divided into sixteen blocks. It should be appreciated that these blocks are not related to SIBs and some information elements may still be repeated in the cycle to minimize their maximum acquisition time. For illustration purposes in the following drawings, the block types will be numbered 1-16. The actual way in which the broadcast channel is allocated within the segments is not particularly important since all UE device handsets are capable of reading such segments in their entirety.

Of prime importance is that a particular segment can deliver a particular block of information from the 16 types available, over an interval T and which represents a number of sub-frames.

The structure of the broadcast channel is the same across the whole system bandwidth and the segments only differ by the block type transported at any point in time.

Figure 5:
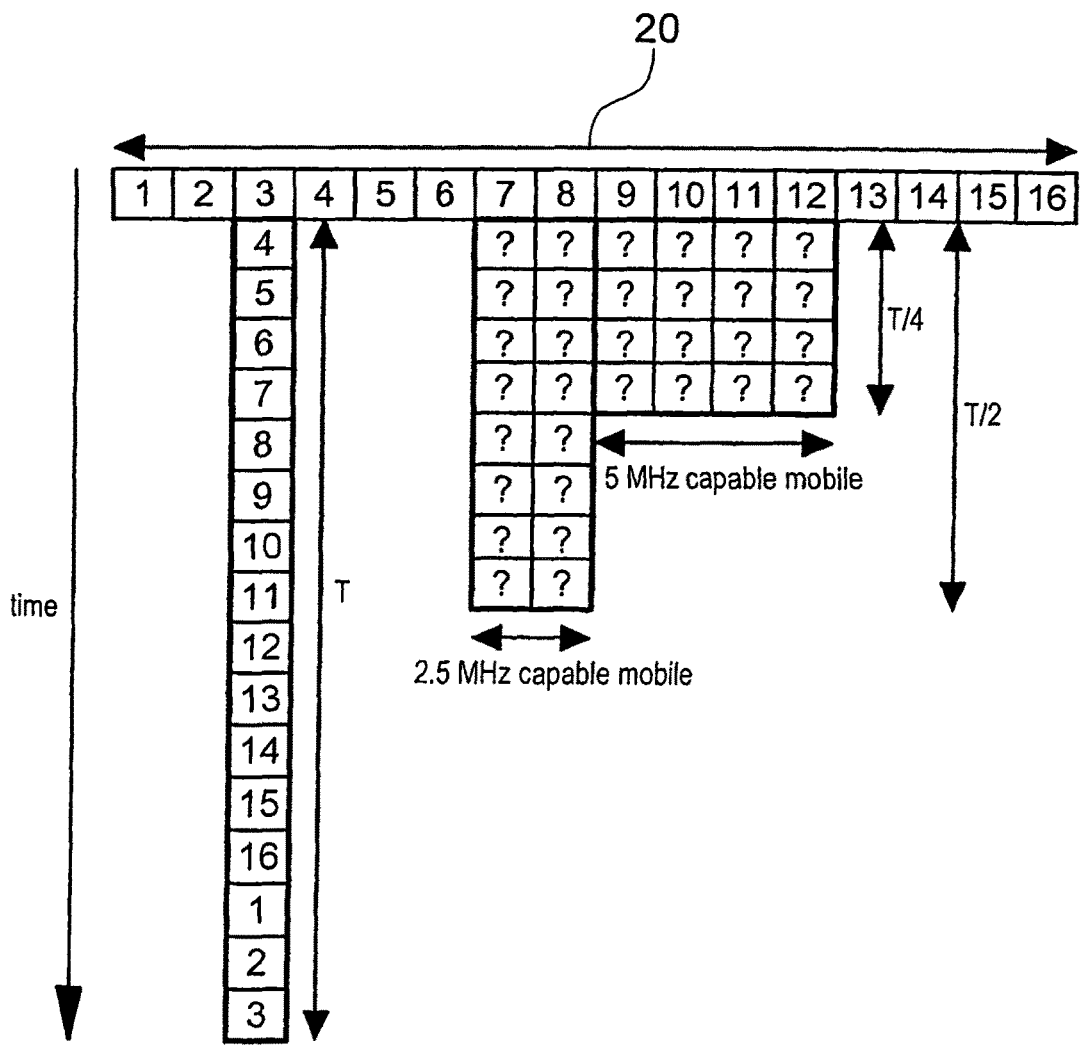
FIG. 5 is a schematic representation of a system bandwidth and questionable broadcast channel structure according to the problem faced by the present invention.

Turning now to FIG. 5, there is provided an illustration of a partial grid system of information blocks against a 20 MHz system bandwidth 20 divided into 16 segments. In order to achieve the required acquisition times, the block types must be distributed so that all blocks are present, and are ideally not repeated in rectangles of widths equal to the capability of the UE handset devices. The ? symbols illustrate the uncertainty that the invention seeks to overcome.

Thus, with regard to FIG. 5 it can be appreciated from the top row how the system band 20 is divided into sixteen segments each representing a 1.25 MHz band with regard to the third segment of the bandwidth, it will be appreciated that, over a time period T, all of the sixteen blocks of broadcast channel data will be received by one of the least-capable UE handset devices, i.e. such device offering only being a 1.25 MHz capable device.

Turning however to segments 7 and 8 within the system bandwidth, it will be appreciated that, with a 2.5 MHz capable UE handset device, assuming appropriate distribution of the blocks within the segments 7 and 8, it could, with appropriate distribution, prove possible to acquire the whole broadcast channel cycle within a time period T/2.

Referring finally to segments 9-12, here it will be appreciated that a 5 MHz capable UE handset device could acquire the whole broadcast channel cycle within a time period T/4.

As will be appreciated, the present invention provides for a distributed broadcast channel particularly for long term evolution cells, in which the broadcast cycle is divided into $2^P$ block types, with p depending on the UE handset capability to be supported, and the usage of the system bandwidth.

Having regard now to FIGS. 7-9, there are illustrated various matrices which can be employed within the concept of the present invention and with differing values of p.

However, with regard to FIG. 6, this comprises a representation with p=3 and it will be appreciated that the least capable user equipment device can obtain all the data blocks within a bandwidth segment so as to obtain the required broadcast channel cycle whereas, in view of the manner of distribution of the blocks throughout the matrix, it proves possible to obtain all data blocks 1-8 either twice as fast, four times as fast, or eight times as fast as the least capable UE handset and, of course, depending upon the capability of the UE handset concerned. With regard to FIG. 7 there is illustrated a matrix in which p=4 and it will be appreciated from the distribution of the blocks that the same rules providing for appropriate distribution of the broadcast channel data apply and allow for acquisition times from T to T/16.

FIGS. 8 and 9 are provided for completeness and illustrate the situations in which p=2 and 1 respectively but are unlikely to find application in practice.

It should of course be appreciated that the present invention provides particular application within 3GPP and for use in relation to any LTE capable user handset device.

As will be appreciated, the invention provides for a broadcast channel distributed across the whole bandwidth of an LTE cell, the system information being ordered in different ways over time in such a way that all user equipment, whatever their maximum bandwidth capability and the band tuned to, can read all the system information, while the higher capability user equipment benefit from the distributed nature of the broadcast channel by being able to read the system information so much faster (over a time roughly inversely proportional to their bandwidth capability). The invention also serves to simplify network design allowing a single broadcast channel structure to fit a range of system bandwidths, possibly different from cell to cell, the rate of the broadcast channel increasing automatically with the bandwidth of cells without changing the channel structure.

According to a first exemplary aspect of the present invention there is provided a broadcast channel transmission method comprising delivering broadcast channel data as a series of blocks, each series being provided in a segment of the system bandwidth, and distributing the broadcast channel data within each series of blocks such that user equipment capable of receiving more than one segment receives different blocks from different segments within a time period wherein the total time period for receipt of all blocks within one segment is a multiple of the said time period.

Such a method can advantageously support both high and low capability UE handsets without reserving spectrum portions for either type, nor penalizing the performance of high capability UE handsets.

As will be appreciated from the following, the present invention provides for a benefit in a communication system that is required to accommodate UE handsets with a bandwidth capability which is significantly lower than the overall system bandwidth and in which the lower-capability UE handsets are not capable of jumping between spectrum allocations further apart than their limit bandwidth. This dictates that any spectrum-resources allocated for a call, or indeed any other service, must be relatively close to resources which transport the broadcast channel.

Preferably, the combination of the segments of the system bandwidth, and the appearance of the series of blocks within each segment in time, can be represented as a two dimensional square grid.

Further, the method can be provided for transmitting a broadcast channel for UE having different capabilities wherein the capabilities differ by a factor N in which $N=2^P$, where p is an integer greater than 0.

The method can also allow for the provision of repeated blocks within each series of blocks.

Further, the broadcast channel is preferably generated at the access gateway, and mapping for the broadcast channel can advantageously be provided at an evolved NodeB.

According to another exemplary aspect of the present invention there is provided a broadcast channel transmission means comprising means for delivering broadcast channel data as a series of blocks, each series being provided in a segment of the system bandwidth, and arranged such that the broadcast channel is distributed within each series of blocks such that user equipment capable of receiving more than one segment is arranged to receive different blocks from different segments within a time period wherein the total time period for receipt of all the blocks within one segment is a multiple of the said time period.

As above, the segments comprising the system bandwidth and the appearance of the series of blocks in time can be represented as a square grid.

Also, the difference in the capability between UE devices can comprise a factor $N=2^P$, where p is an integer greater than 0.

The transmission means can be arranged for repeating blocks within at least one series of blocks.

The invention claimed is:

1. A broadcast channel transmission method for a communication system comprising a system bandwidth divided into a number of segments, each segment having a same respective bandwidth, the method comprising:
   delivering broadcast channel data as a respective series of blocks concurrently in each segment of the system bandwidth; and
   distributing broadcast channel data within each series of blocks such that a user equipment capable of receiving more than one segment receives cumulative broadcast channel data within a time period, each different part of said cumulative broadcast channel data being received in blocks of a different respective segment,
   wherein a total time period for receipt of said cumulative broadcast channel data within blocks of one segment is a multiple of said time period, and
   wherein the broadcast channel data is distributed within said each series of blocks such that a user equipment capable of receiving only two adjacent segments of said bandwidth receives each different part of said cumulative broadcast channel data in the blocks of a different respective one of said two adjacent segments before any of different parts of said cumulative broadcast channel data are repeated in either of said two adjacent segments.

2. A method as claimed in claim 1, said method transmitting a broadcast channel for UE (User Equipment) handsets having different capabilities,
   wherein the capabilities differ by a factor N in which $N=2^P$, where p is an integer greater than 0.

3. A method as claimed in claim 1, wherein a broadcast channel is transmitted at a higher rate at a center of the system bandwidth than a rate that is transmitted near a source allocated to a UE (User Equipment) device.

4. A method as claimed in claim 1, said method transmitting a broadcast channel, in which a broadcast cycle is divided into $2^P$ block types, wherein p is an integer greater than 1 and depends on a UE (User Equipment) handset capability to be supported and a usage of the system bandwidth.

5. A method as claimed in claim 1, wherein information included in said blocks comprises broadcast channel data of a Long Term Evolution (LTE) cell.

6. A method as claimed in claim 1, said method transmitting a broadcast channel in which a broadcast cycle is divided into $2^P$ block types, wherein p is an integer greater than 0 and depends on a UE (User Equipment) handset capability to be supported and a usage of the system bandwidth.

7. A method as claimed in claim 1, wherein the user equipment capable of receiving said only two adjacent segments of said bandwidth receives all the blocks in two time slots.

8. A method as claimed in claim 1, wherein the total time period for receipt of said cumulative broadcast channel data within blocks of one segment is twice as long as said time period.

9. A method as claimed in claim 1, wherein the user equipment capable of receiving said only two adjacent segments of said bandwidth receives all the blocks during a time that is half of the total period.

\* \* \* \* \*